United States Patent [19]

Jones

[11] Patent Number: 4,578,104

[45] Date of Patent: Mar. 25, 1986

[54] MANUFACTURE OF MOULDED ARTICLES OF GLASSWARE

[75] Inventor: Stanley P. Jones, Tickhill, England

[73] Assignee: Emhart Industries, Inc., Farmington, Conn.

[21] Appl. No.: 584,067

[22] Filed: Feb. 27, 1984

[51] Int. Cl.⁴ .............................................. C03B 9/38
[52] U.S. Cl. ...................................... 65/267; 65/265; 65/319; 65/356
[58] Field of Search .................... 65/29, 83, 162, 265, 65/267, 319, 356

[56] References Cited

U.S. PATENT DOCUMENTS 4,251,253  2/1981  Becker et al. ........................... 65/267
4,388,099  6/1983  Hermening et al. ............... 65/319 X

*Primary Examiner*—Arthur Kellogg
*Attorney, Agent, or Firm*—H. Samuel Kieser

[57] ABSTRACT

The mould used in manufacturing moulded articles is cooled by cooling fluid flowing along a cooling passage in the mould. In order to concentrate the cooling effect in a desired central region of the cooling passage, an exit portion of the passage is enlarged relative to the central region. If desired, the entrance portion may also be enlarged to further concentrate the cooling effect.

6 Claims, 5 Drawing Figures

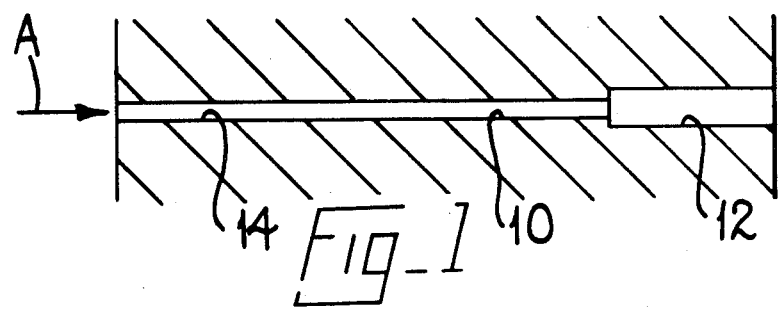
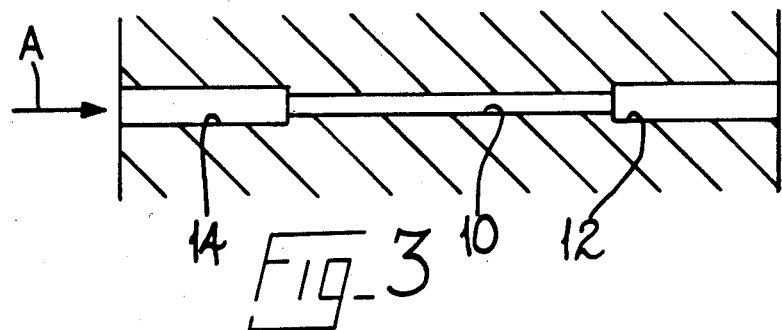
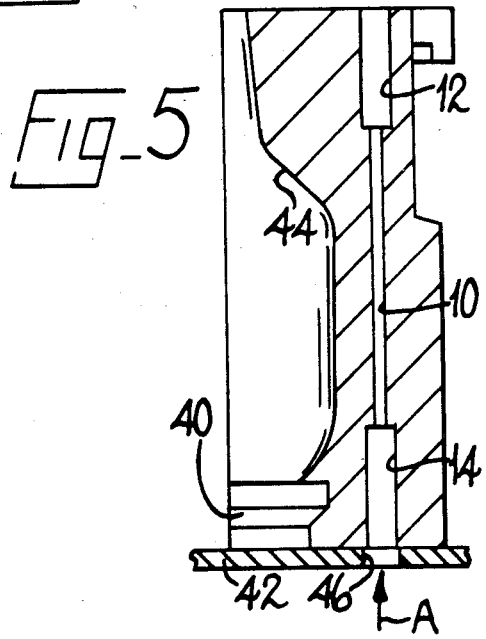

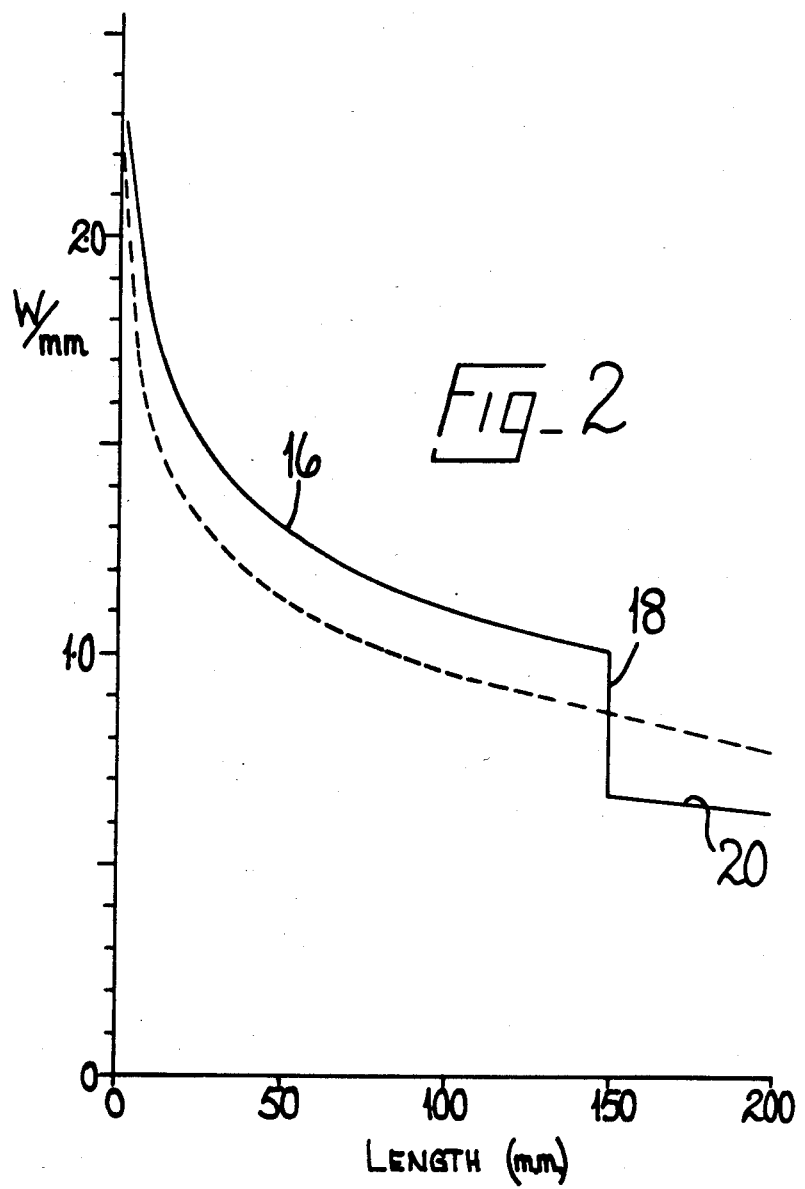

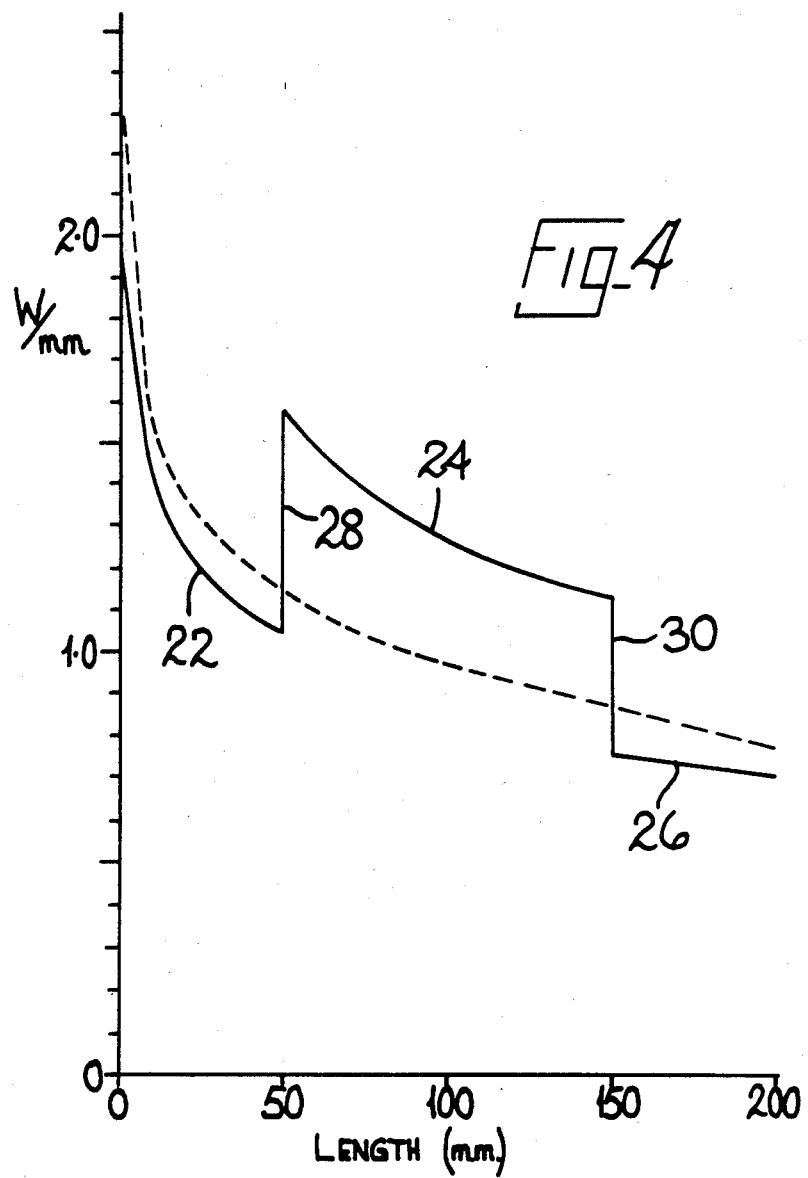

MANUFACTURE OF MOULDED ARTICLES OF GLASSWARE

BACKGROUND OF THE INVENTION

This invention is concerned with methods of manufacturing moulded articles of glassware and with mould portions for use in such manufacture.

The manufacture of moulded articles of glassware frequently involves a necessity to cool the mould used either during a moulding operation or between successive moulding operations. For example, in the manufacture of glassware by a glassware forming machine of the individual section type, gobs of molten glass are delivered successively to moulds in which the gobs are formed into parisons and subsequently to further moulds in which the parisons are formed into finished articles. The moulds of a machine of the individual section type absorb heat from the glass at a rate which is faster than the heat can be dissipated without the provision of cooling means for the moulds. Where it is necessary to provide such cooling around a mould cavity of the mould, it is known to provide a plurality of cylindrical cooling passages in the mould distributed around the mould cavity and to pass cooling fluid through these passages so that the cooling fluid absorbs heat from the mould and carries it away. The cooling effect can be varied around the mould cavity by controlling the supply of cooling fluid to each passage independently. U.K. Patent Specification No. 1533622 describes such an arrangement. In such cooling arrangements, the cooling effect achieved is influenced by the velocity of the air, its degree of turbulence and the temperature difference between the air and the wall of the passage. The cooling effect, therefore, is greatest in an entrance portion of the passage where the turbulence and temperature difference are greatest and progressively decreases along the length of the passage. This progressive decrease in cooling effect is disadvantageous in cases where the maximum cooling effect should ideally be in the central portion of the cooling passage. For example, where a bottle-shaped article is being moulded, the mould comprises an end portion into which the mould cavity does not extend and which does not require much cooling, a central portion in which most of the mould cavity is formed and which requires the most cooling as it contains the most molten material, and an opposite end portion in which a neck portion of the mould cavity is formed and which requires less cooling than the central portion because it contains less molten material. The cooling passages extend through the end portions as well as through the central portion so that, in order to achieve sufficient cooling in the central portion, at least one of the end portions has to be cooled more than is desirable because the concentration of the cooling effect at the entrance. Attempts have been made to concentrate the cooling effect where desired by inserting a tube made of insulating material into an entrance portion of each cooling passage to reduce the cooling effect in the entrance portion and therefore increase it in other portions of the passage. The above mentioned U.K. Patent Specification No. 1533622 describes the use of such insulating tubes. This, however, is only a partial solution to the problem which is also inconvenient as the tubes must be secured in position. Furthermore, the presence of the insulating tubes, reduces the available area for fluid flow and thereby increases the resistance to flow along the passage.

It is an object of the present invention to provide a method of manufacturing moulded articles in which the mould is cooled by cooling fluid flowing along a cooling passage in the mould and the cooling effect is concentrated without the use of an insulating tube.

BRIEF SUMMARY OF THE INVENTION

The invention provides a method of manufacturing moulded articles of glassware in which molten glass is shaped in a mould and the mould is cooled by cooling fluid flowing along a cooling passage formed in the mould, wherein the cooling passage comprises a central portion of substantially uniform cross-sectional area connecting an entrance portion and an exit portion thereof so that cooling fluid can flow from the entrance portion into the central portion and from thence into the exit portion, the exit portion having a greater cross-sectional area throughout than the central portion.

In a method in accordance with the last preceding paragraph, the cooling effect in the exit portion of the cooling passage is reduced while the effect of the central portion is increased in comparison with a cooling passage of uniform cross-sectional area throughout. The exit portion can be arranged to be in either of the end portions of a mould so that the cooling effect is concentrated in central portion of the mould between the two end portions.

Preferably, in order to further concentrate the cooling effect, the entrance portion also has a greater cross-sectional area than the central portion.

Where the mould defines a generally bottle-shaped cavity in which the molten glass is shaped and the cooling passage extends generally parallel to a central longitudinal axis of the cavity, the central portion of the cooling passage may extend opposite a generally cylindrical central portion of the cavity and the entrance and exit portions each extend opposite an end portion of the cavity, one end portion being a base portion arranged to mould a base portion of a bottle and the other end portion being a neck portion arranged to mould a neck portion of a bottle.

The invention also provides a mould portion for use in manufacturing articles of glassware, the mould portion having at least one cooling passage extending longitudinally therein so that cooling fluid can flow through the cooling passage and cool the mould portion, characterised in that the cooling passage comprises a central portion extending through a central region of the mould portion and connecting entrance and exit portions of the cooling passage so that cooling fluid can flow from the entrance portion into the central portion and from thence into the exit portion, the central portion being of substantially uniform cross-sectional area, and the exit portion having a greater cross-sectional area throughout than the central portion.

In a mould portion according to the last preceding paragraph, the exit portion may be of substantially uniform cross-sectional area or it may increase in cross-sectional area away from the central portion. The increase in cross-sectional area of the exit portion concentrates the cooling effect in the remainder of the mould. The cooling effect can be further concentrated in the central portion of the cooling passage if the entrance portion of the cooling passage is of greater cross-sectional area than the central portion. The entrance portion may be of uniform cross-sectional area or increase in cross-sectional area away from the central portion.

Where the mould portion defines a portion of a generally bottle-shaped cavity in which the molten glass is shaped and the cooling passage extends generally parallel to a central longitudinal axis of the cavity, the central portion of the cooling passage may extend opposite a generally cylindrical central portion of the cavity and the entrance and exit portions each extend opposite an end portion of the cavity, one end portion being a base portion arranged to mould a base portion of a bottle and the other end portion being a neck portion arranged to mould a neck portion of a bottle.

BRIEF DESCRIPTION OF THE DRAWINGS

There now follows a detailed description, to be read with reference to the accompanying drawings, of a method of manufacturing moulded articles and two alternative mould portions for use in manufacturing articles of glassware which are illustrative of the invention. It is to be understood that the illustrative method and the illustrative mould portions have been selected for description by way of example and not of limitation of the invention.

In the drawings:

FIG. 1 is a cross-sectional view of a cooling passage of the first illustrative mould portion;

FIG. 2 is a graph showing the heat extraction along the cooling passage shown in FIG. 1;

FIG. 3 is a cross-sectional view of a cooling passage of the second illustrative mould portion;

FIG. 4 is a graph of the heat extraction along the cooling passage of FIG. 3; and FIG. 5 is a longitudinal cross-sectional view of the second illustrative mould portion.

DETAILED DESCRIPTION OF PREFERRED EMBODIMENT OF THE INVENTION

In the illustrative method and moulds, glass is shaped in a mould and the mould is cooled by cooling fluid, for example air, flowing along a cooling passage formed in the mould. Although only one cooling passage is illustrated, it is to be understood that there may be a plurality of similar cooling passages distributed around a mould cavity. Either the first illustrative mould portion or the second illustrative mould portion can be used in the illustrative method but in either case the cooling passage comprises a central portion 10 of substantially uniform cross-sectional area and circular cross-section. The central portion 10 connects an entrance portion 14 of the cooling passage to an exit portion 12 thereof so that cooling fluid can flow, in the direction indicated by the arrow A, from the entrance portion 14 into the central portion 10 and from thence into the exit portion 12. The exit portion 12 is of substantially uniform cross-sectional area and circular cross-section and has a greater cross-sectional area than the central portion 10.

The cooling effect achieved in the illustrative method is different depending on whether the first illustrative mould portion shown in FIG. 1 or the second illustrative mould portion shown in FIGS. 3 and 5 is used. This is because, while both the first and the second illustrative mould portions have cooling passages which have an entrance portion 14 arranged so that the cooling fluid can flow from the entrance portion 14 into the central portion 10, in the case of the first illustrative mould portion the entrance portion 14 is of circular cross-section and of substantially the same cross-sectional area as the central portion 10, however, in the case of the second illustrative mould portion, the entrance portion 14 is of substantially uniform cross-sectional area but is of greater cross-sectional area than the central portion 10. Thus, both the first and the second illustrative mould portions have at least one cooling passage extending longitudinally therein so that the cooling fluid can flow through the cooling passage and cool the mould portion. In both cases, the cooling passage comprises a central portion 10 extending through a central region of the mould portion, the central portion 10 being of substantially uniform cross-sectional area, and an exit portion 12 extending through an end region of the mould portion, the exit portion 12 being arranged so that cooling fluid can flow from the central portion 10 into the exit portions 12 and the exit portion 12 being of substantially uniform cross-sectional area and having a greater cross-sectional area than the central portion 10. However, while the first illustrative mould portion has a cooling passage having an entrance portion 14 which is of the same cross-sectional area as the central portion 10, the entrance portion 14 of the second illustrative mould portion is of greater cross-sectional area than the central portion 10 thereof.

FIG. 2 shows the cooling effect achieved in the illustrative method using the first illustrative mould portion. It is a graph representing the heat extraction in watts per millimeter plotted against the length of the cooling passage in millimeters beginning at the entrance portion 14. Although the flow of cooling fluid (indicated by the arrow A) along the cooling passage is uniform, the amount of heat extraction reduces as the air moves along the passage as the air becomes hotter and therefore the temperature differential between the air and the walls of the cooling passage reduces. Thus, the graph of FIG. 2 illustrates that the heat extraction reduces away from the entrance portion 14 along the curve 16. At the junction between the central portion 10 and the exit portion 12, there is a very rapid reduction in the heat extracted per millimeter as shown by the portion 18 of the graph of FIG. 2 and in the exit portion 12 the extraction is shown by the almost flat curve 20. The broken line in FIG. 2 represents the heat extracted per millimeter for a cooling passage of uniform cross-sectional area throughout, the cross-sectional area being equal to that of the central portion 10. By comparing the broken line with the solid line 16, 18, 20 it will be seen that the cooling passage of the first illustrative mould portion achieves an enhanced cooling effect in the central portion 10 and in the entrance portion 14 but a reduced cooling effect in the exit portion 20.

FIG. 4 shows the graph of the heat extraction in watts per millimeter against the length of the cooling passage of the second illustrative mould portion. The second illustrative mould portion is arranged to cooperate with a bottom plate 40 (FIG. 5), resting on a support plate 42, and with a further mould portion (not shown) to define a mould cavity 44. The cooling passage 14, 10, 12 extends longitudinally of the mould portion and the cavity 44 receiving fluid through a hole 46 in the support plate 42 in the direction of the arrow A. The portion 22 of the graph shows the cooling effect in the entrance portion 14, the portion 24 shows the cooling effect in the central portion 10, and the portion 26 shows the cooling effect in the exit portion 12. The portions 28 and 30 show respectively the rapid changes of cooling effect which occur at the junctions between the entrance portion 14 and the central portion 10 and the central portion 10 and the exit portion 12. The broken line in FIG. 4 shows the graph for a uniform cooling passage having the same cross-sectional area as the central portion 10. From a comparison of the broken and solid lines in FIG. 4, it will be seen that the cooling effect is reduced in the entrance portion 14 from that which would be achieved in a uniform cooling passage while the cooling effect in the central portion is increased. The cooling effect in the exit portion is also reduced.

In the illustrative method using either the first illustrative mould portion or the second illustrative mould portion, the cooling effect of the flowing cooling fluid is concentrated in a central portion of the cooling passage without the use of insulating materials.

FIG. 5 illustrates that the mould may define a generally bottle-shaped cavity 44 a portion of which is defined by either the first or the second illustrative mould portion. The cooling passage 14, 10, 12 extends generally parallel to a central longitudinal axis of the cavity 44 with the central portion 10 extending opposite a generally cylindrical central portion of the cavity which shapes a central portion of a bottle. The entrance portion 14 and the exit portion 12 extend opposite respective end portions of the cavity 44. One end portion is a base portion arranged to co-operate with the base plate 40 in moulding a base portion of a bottle and the entrance portion 14 is opposite this end portion. The other end portion, opposite which is the exit portion 12 is arranged to mould a neck portion of a bottle.

I claim:

1. A mould portion for use in manufacturing articles of glassware, the mould portion having at least one cooling passage extending longitudinally therein so that cooling fluid can flow through the cooling passage and cool the mould portion, wherein the cooling passage comprises a central portion extending through a central region of the mould portion and connecting entrance and exit portions of the cooling passage, so that cooling fluid can flow from the entrance portion into the central portion and from thence into the exit portion, said exit portion being co-axial with said central portion, the central portion being of substantially uniform cross-sectional area, and the exit portion having a greater cross-sectional area throughout than the central portion sufficient to result during flow of the cooling fluid in reduced heat extraction along the portion of the mould adjacent said exit portion.

2. A mould portion according to claim 1, wherein the exit portion is of substantially uniform cross-sectional area.

3. A mould portion according to claim 1, wherein the exit portion increases in cross-sectional area away from the central portion.

4. A mould portion according to any one of claims 1 to 3, wherein the entrance portion of the cooling passage is of greater cross-sectional area than the central portion.

5. A mould portion according to claim 4, wherein the entrance portion increases in cross-sectional area away from the central portion.

6. A mould portion according to claim 1, wherein the mould portion defines a portion of a generally bottle-shaped cavity in which the molten glass is shaped and the cooling passage extends generally parallel to a central longitudinal axis for the cavity, wherein the central portion of the cooling passage extends opposite a generally cylindrical central portion of the cavity and the entrance and exit portions each extend opposite an end portion of the cavity, one end portion being a base portion arranged to mould a base portion of a bottle and the other end portion being a neck portion arranged to mould a neck portion of a bottle.

* * * * *